US012470247B2

(12) United States Patent
Wiegner et al.

(10) Patent No.: US 12,470,247 B2
(45) Date of Patent: Nov. 11, 2025

(54) TRANSCEIVER (71) Applicant: NOKIA SOLUTIONS AND NETWORKS OY, Espoo (FI)

(72) Inventors: Dirk Wiegner, Schwaikheim (DE); George Hotopan, Esslingen (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 519 days.

(21) Appl. No.: 17/916,669

(22) PCT Filed: Mar. 25, 2021

(86) PCT No.: PCT/EP2021/057782
§ 371 (c)(1),
(2) Date: Oct. 3, 2022

(87) PCT Pub. No.: WO2021/198026
PCT Pub. Date: Oct. 7, 2021

(65) Prior Publication Data
US 2023/0163801 A1 May 25, 2023

(30) Foreign Application Priority Data
Apr. 2, 2020 (FI) .................................... 20205339

(51) Int. Cl.
*H04B 1/40* (2015.01)
*H04B 1/16* (2006.01)

(52) U.S. Cl.
CPC .............. *H04B 1/40* (2013.01); *H04B 1/1615* (2013.01); *H04B 1/163* (2013.01); *H03F 2200/451* (2013.01)

(58) Field of Classification Search
CPC ........ H04B 1/40; H04B 1/1615; H04B 1/163; H03F 2200/451
See application file for complete search history.

(56) References Cited

U.S. PATENT DOCUMENTS 5,590,412 A * 12/1996 Sawai ....................... H03F 3/72
455/86
2007/0071128 A1* 3/2007 Meir ................... H04W 52/343
375/297

(Continued)

FOREIGN PATENT DOCUMENTS

CN 101447763 A 6/2009
CN 102204110 A 9/2011

(Continued)

OTHER PUBLICATIONS

Office Action and Search Report dated Dec. 7, 2023, corresponding to Chinese Patent Application No. 202180029629.7.

(Continued)

*Primary Examiner* — Marcus Hammonds
(74) *Attorney, Agent, or Firm* — SQUIRE PATTON BOGGS (US) LLP (57) ABSTRACT

Aspects and embodiments provide a transceiver comprising: a transmit signal path; a receive signal path; bidirectional amplification circuitry reconfigurable for use in both the transmit signal path or receive signal path. The amplification circuitry includes at least one resonant tunnelling diode; and the control circuitry is configured to selectively couple the amplification circuitry into the transmit or receive path of the transceiver in dependence upon whether the transceiver is to operate to transmit or receive a signal. The compact and energy efficient transceiver system in accordance with aspects and embodiments recognises that the physical properties of resonant tunnelling diodes provide a mechanism for simplification of transceiver circuitry and may enable transceiver arrangements which can operate in the high mm-wave and terahertz frequency ranges.

14 Claims, 6 Drawing Sheets

(56) References Cited

U.S. PATENT DOCUMENTS

| | | | |
|---|---|---|---|
| 2010/0309827 A1* | 12/2010 | Choi ..................... | H04B 1/403 370/294 |
| 2014/0098845 A1* | 4/2014 | Egard ..................... | H03B 7/08 331/107 T |
| 2018/0226932 A1* | 8/2018 | Beaudin ............ | H04W 52/0261 |

FOREIGN PATENT DOCUMENTS

| | | | |
|---|---|---|---|
| EP | 1700375 A1 | 9/2006 | |
| EP | 3316488 A1 * | 5/2018 | .............. H04B 1/44 |

OTHER PUBLICATIONS

RF Power Analysis on 5.8 GHz Low-Power Amplifier Using Resonant Tunneling Diodes, Jongwon Lee and Kyounghoon Yang, IEEE Microwave and Wireless Components Letters, vol. 27, No. 1, p. 61-63, Jan. 31, 2017.

International Search Report and Written Opinion dated Jun. 15, 2021 corresponding to International Patent Application No. PCT/EP2021/057782.

Jongwon Lee et al., "RF Power Analysis on 5.8 GHz Low-Power Amplifier Using Resonant Tunneling Diodes," IEEE Microwave and Wireless Components Letters, vol. 27, No. 1, Jan. 1, 2017, pp. 61-63, XP011638536.

Bosung Suh et al., "A 7-GHz CMOS Bidirectional Variable Gain Amplifier with Low Gain and Phase Imbalances," IEEE Transactions on Circuits and Systems I: Regular Papers, IEEE, vol. 65, No. 9, Sep. 1, 2018, pp. 2669-2678, XP011688021.

Naoto Oshima et al., "Wireless data transmission of 30 Gbps at a 500-GHz range using resonant-tunneling-diode terahertz oscillator," 2016 IEEE MTT-S International Microwave Symposium (IMS), IEEE, May 22, 2016, pp. 1-4, XP032941163.

Jongwon Lee et al., "5 GHz low-power RTD-based amplifier MMIC with a high figure-of-merit of 24.5 dB/mW," Indium Phosphide and Related Materials (IPRM), 2013 International Conference on, IEEE, May 19, 2013, pp. 1-2, XP032436983.

Communication pursuant to Article 94(3) EPC dated Jan. 23, 2025, corresponding to European Patent Application No. 21 715 533.0.

Notification of Second Office Action dated May 8, 2024 corresponding to Chinese Patent Application No. 2021800296297, with English translation thereof.

* cited by examiner

TRANSCEIVER

TECHNOLOGICAL FIELD

Aspects and embodiments relate to transceivers and methods of operating transceivers. In particular, examples relate to amplifiers for amplifying both transmit and receive signals in transceivers for use in wireless telecommunications systems.

BACKGROUND

Increased use of wireless communication devices, such as smart phones, laptops, and Internet of Things (IoT) devices, poses a set of challenges regarding electronic design of those devices and the hardware of supporting architecture. In order to meet current and future challenges in relation to wireless communication networks including, for example, high data rates, high coverage, low latency and the control of IoT-enabled devices, advanced concepts and systems are required. Such advanced concepts and systems include, for example, multi-antenna beam forming systems, massive MIMO systems and smart transceiver solutions. There is a desire to provide such advanced solutions and ensure that those solutions meet stringent requirements in terms of system and device costs, power consumption and design complexity.

Accordingly, in relation to, for example multi antenna beam forming systems, massive MIMO systems, and/or IoT devices, there is a demand for compact, energy efficient transceiver solutions which can be implemented in a manner which is simple and low cost. It will be appreciated, for example, that multi-antenna systems and massive MIMO systems typically comprise a large number of transceivers and the inclusion of such a large number of transceivers in a wireless communication system can lead to: high complexity, significant power usage and an increase in overall system cost.

EP3316488A1 describes a compact transceiver concept particularly suited to use in multi-antenna massive MIMO and/or IoT devices. A single amplification path for downlink and uplink is described. That single "reversible" amplification path is achieved by the use of two RF switches in combination with the amplification path and adequate transceiver control. The arrangement described comprises two switches which must be operated adequately and in a coordinated manner.

Aspects recognise that there is an ongoing demand to provide alternative compact low power transceivers having low hardware complexity at a reasonable manufacturing cost.

BRIEF SUMMARY

The scope of protection sought for various embodiments of the invention is set out by the independent claims. The examples and features, if any, described in this specification which do not fall under the scope of the independent claims are to be interpreted as examples useful for understanding various aspects and embodiments of the invention.

According to the first aspect, a transceiver comprising: a transmit signal path; a receive signal path; bidirectional amplification circuitry reconfigurable for use in both the transmit signal path or receive signal path is provided, the amplification circuitry including at least one resonant tunnelling diode; and the control circuitry being configured to selectively couple the amplification circuitry into the transmit or receive path of the transceiver in dependence upon whether the transceiver is to operate to transmit or receive a signal.

The first aspect recognises that resonant tunnelling diodes (RTD) may be suited to use in a bidirectional amplification path transceiver circuit for use in a wireless communication network. Resonant tunnelling diodes are known electronic semiconductor components. In their simplest form, a resonant tunnelling diode comprises vertical stacks of nanometric epitaxial layers of semiconductor alloys which together form a double barrier quantum well (DBQW). The double barrier quantum well is typically formed of two barrier layers of a wide band gap III/V semiconductor, for example, Aluminium Arsenide (AlAs) with a thickness less than two nanometres, and a lower band gap material sandwiched in between, for example, Indium Gallium Arsenide (InGaAs) with a thickness less than ten nanometres. The electrical carrier transport across a DBQW occurs mainly through resonant tunnelling quantum effects. The DBQW acts like a Fabry-Perot interferometer for the wave functions of the charge carriers. That functionality gives rise to a substantially N-shaped current voltage characteristic of the semiconductor component. RTDs are notable since they exhibit two distinct features when compared to other semiconductor devices namely: negative differential conductance (NDC); and extremely high frequency operation.

Figure 1:
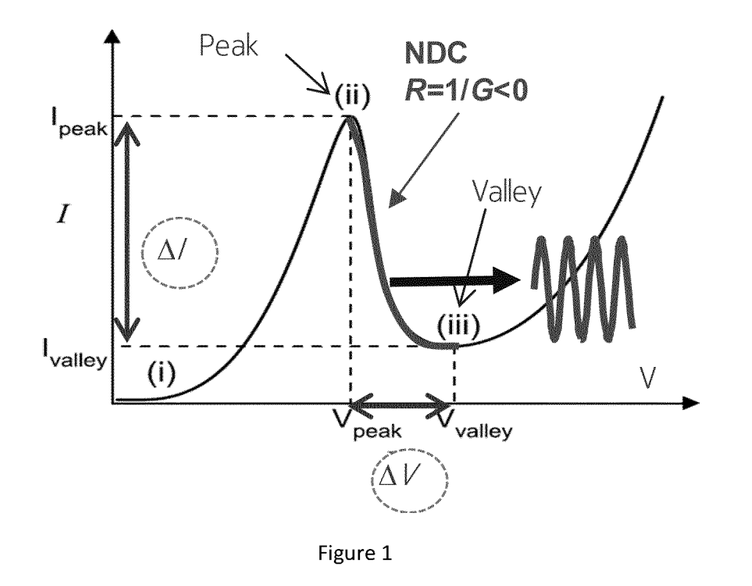
FIG. 1 illustrates schematically a characteristic N-shaped relationship between current and voltage in relation to a resonant tunnelling diode.

FIG. 1 illustrates schematically a characteristic N-shaped relationship between current and voltage in relation to a resonant tunnelling diode. It is the N shape of the I-V relationship, a region of which (between (ii) and (iii) in FIG. 1, or the "downstroke region") is referred to as displaying negative differential conductance, which gives rise to electric gain.

The high frequency operation of an RTD arises from the nature of the resonant tunnelling structure in the form of very thin (nanometre) layers occurring along the direction of carrier transport. RTDs are currently the fastest pure solid-state electronic devices in operation at room temperature, with working frequencies of over two terahertz.

It will be appreciated that the negative differential conductance (and resulting electric gain) and high frequency of operation make RTDs an attractive candidate for use in components of a wireless communication network. In particular, RTDs can be configured to operate as, for example, amplifiers and oscillators and therefore provide a mechanism to reduce the number of electronic components and elements required within a circuit or on a chip to provide a given function. The first aspect recognises that an RTD fundamentally operates to behave as an oscillator, with the added benefit that it can operate to provide amplification due to the intrinsic nature of its IV characteristic curve, which shows negative differential resistance/conductance and provides electric gain when a bias voltage is applied to ensure operation in the NDC region. When a bias voltage is applied such that the RTD operates outside the NDR region it can be used as a receiver particularly given the increased sensitivity shown close to a peak current point. It will thus be appreciated that an RTD operates quite differently to traditional transistors which are typically used in transceivers. The first aspect recognises an RTD can be used as part of a bi-directional amplification path in a transceiver and that use of an RTD in relation to a transceiver may enable a simplified hardware arrangement which has decreased power consumption with increased functionality, speed and circuit reliability. In particular, for example, when compared to classical transistors, RTDs are two-terminal devices with one input and one output and require a single bias voltage to operate as opposed to those classical transistors which are usually three terminal devices and require 2 or 3 bias voltages. Examples recognise that the use of RTDs may provide wider benefits in the context of wireless communication solutions. Namely: in relation to provision of seamless integration with optical front hauling, for example, in the context of short haul or femtocells, and in wireless access scenarios, for example, fibre optic cloud radio access network having a centralized base band processing where short range wireless connections allow for the use of low power consumption transceivers.

Examples recognise that the N shaped I-V relationship of an RTD shown schematically in FIG. 1 can assist in relation to transceiver operation. It will be appreciated that when operating a transceiver including an RTD in the amplification chain, in transmitting mode, the bias voltage applied to the RTD will be chosen such that the RTD operates between regions (ii) and (iii) shown in FIG. 1. As described previously, that region is known as the negative differential conductance region. When operating as a receiver, the ideal RTD condition is fulfilled when the bias voltage is chosen to be close to the peak point in the N-shaped I-V characteristic, that is to say, in the vicinity of (ii) where the RTD device is most sensitive.

The first aspect recognises particularly that it is possible to use an RTD device in a similar compact transceiver arrangement to that described in EP3316488A1. In particular, the single amplification path used for downlink and uplink in EP3316488A1 can be implemented using an RTD, allowing for removal of at least one low noise amplifier compared to that arrangement. As a result, embodiments allow for provision of an alternative transceiver with further reduced complexity, improved efficiency and likely lower cost. Compared to the previous arrangement, embodiments may provide for implementations which do not require provision of a switch at the low noise amplifier output. Removal of that switch may mitigate losses and improve overall transceiver efficiency.

The first aspect may prove particularly useful in relation to high frequency applications. RTDs are high frequency capable and are suited to use in applications in the 100 GHz and over region, making a transceiver in accordance with the first aspect particularly suitable for high millimetre wave and THz applications.

The first aspect provides an alternative compact, energy efficient transceiver. That transceiver may be particularly suited to wireless communication applications. The first aspect may provide a simple amplification chain at low cost with particular application in relation to multi-antenna systems, massive MIMO and IoT devices. The compact and energy efficient transceiver system in accordance with the first aspect recognises that the physical properties of resonant tunnelling diodes provide a mechanism for simplification of transceiver circuitry and may enable transceiver arrangements which can operate in the high mm-wave and THz frequency ranges.

The transceiver may be such that the control circuitry is configured to adjust a supply voltage associated with the at least one resonant tunnelling diode of the amplification circuitry depending on an operating mode of the transceiver.

The transceiver may be such that when the transceiver is to operate to transmit a signal, the control circuitry is configured to adjust the supply voltage associated with the at least one resonant tunnelling diode to a value such that the resonant tunnelling diode operates in a negative differential conductance region of an N-shaped current-voltage characteristic associated with the at least one resonant tunnelling diode. Accordingly, the transceiver may be configured such that the amplification circuitry operates in a high gain region of the RTD.

The transceiver may be such that when the transceiver is to operate to receive a signal, the control circuitry is configured to adjust the supply voltage associated with the at least one resonant tunnelling diode to a value such that the resonant tunnelling diode operates in a region of the peak of an N-shaped current-voltage characteristic associated with the at least one resonant tunnelling diode. Accordingly, by applying a supply or bias voltage in the region of, or close to, a peak of the N-shaped current-voltage characteristic, the transceiver may operate, in receive mode, with sensitivity to, a received signal.

The transceiver may be such that the control circuitry comprises: a switch, circulator, or splitter and resonant tunnelling diode supply voltage controller and wherein the amplification circuitry is coupled between the switch, circulator or splitter and an antenna connector.

The transceiver may be such that the control circuitry is configured to couple the amplification circuitry into a signal path as a first amplifier in the receive signal path to amplify a received radio-frequency signal.

The transceiver may be such that the transceiver further comprises an additional amplifier and the control circuitry is configured to couple the additional amplifier into the receive path as a second amplifier in the receive signal path. Accordingly, a second amplifier, for example, a Low Noise Amplifier (LNA) may, in some arrangements, form part of the transceiver receive path.

The transceiver may be such that the control circuitry is configured to couple the amplification circuitry into a signal path as a final amplifier stage in the transmit signal path to amplify a radio-frequency signal to be transmitted.

The transceiver may be such that the amplification circuitry further comprises one or more of: a band pass filter; a dual band filter; an adjustable attenuator.

The transceiver may be such that the amplification circuitry includes an adjustable attenuator, the control circuitry is configured to set attenuation of the attenuator in dependence upon one or more of: operating mode of the transceiver, network load, and converter control.

The transceiver may be configured to operate to receive and transmit a THz frequency signal. The transceiver may be configured to operate to receive and transmit a mm-wave or microwave frequency signal. Accordingly, RTD devices operate across a broad band of frequencies and are capable of generating signals from the lower RF spectrum (microwave) up to THz. Compared to a traditional transistor, an RTD has simplified circuitry and can handle higher frequencies in, for example, the THz domain, whilst operating at room temperature meaning that a transceiver may mitigate any need for provision of additional cooling devices.

A second aspect provides an electronic radio communications device comprising a transceiver according to the first aspect. The electronic radio communications device may comprise a fixed or mobile network node. That network node may comprise a network access node, for example, a base station or router, or a mobile network node, for example, user equipment, IoT enabled devices and similar.

A third aspect provides transceiver system comprising a plurality of antennas and a plurality of transceivers according to the first aspect, wherein each transceiver of the plurality of transceivers is coupled to at least one antenna of the plurality of antennas.

A fourth aspect provides method for operating a transceiver, the method comprising: coupling bidirectional amplification circuitry including at least one resonant tunnelling diode into a receive signal path of the transceiver to amplify a receive signal during a receive operating mode of the transceiver; and coupling the bidirectional amplification circuitry including at least one resonant tunnelling diode into a transmit signal path of the transceiver to amplify a transmit signal during a transmit operating mode of the transceiver.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION

Some example embodiments will now be described with reference to the accompanying drawings in which.

DETAILED DESCRIPTION

Before discussing the example embodiments in any more detail, first an overview will be provided.

Figure 2A:
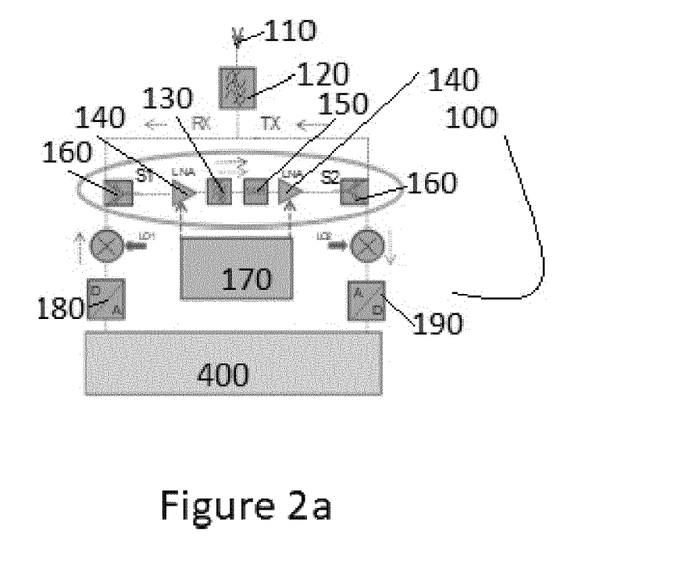
FIG. 2a illustrates schematically an example known compact transceiver arrangement.

It will be appreciated that compact transceivers for use in wireless communication network antennae are known. Examples of such compact transceivers are shown in, for example, EP3316488A1. That compact transceiver concept disclosed in EP3316488A1 uses a single amplification path, for example, realised by low noise amplifiers, in a common manner for both downlink and uplink operation. Reuse of a single amplification path is enabled by coordinated operation of two RF switches. An example of a known compact transceiver concept is shown in FIG. 2a. The example antenna apparatus 100 comprises: an antenna 110, which is configured to both transmit (Tx) and receive (Rx) wireless communication signals. In the arrangement illustrated a digital unit, for example, a baseband unit, 400 is coupled to the antenna no via a bidirectional amplification path and various other components. Taking Tx operation first, a signal to be transmitted is identified by digital unit 400 and passed through a digital to analogue converter 180. Switches 160 are configured to allow a common set of components to operate in both the transmit and receive chains. The signal to be transmitted by the antenna no is passed through Low Noise Amplifiers (LNA) 140, the operation of which is controlled by voltages set by a voltage control unit 170, and appropriate bandpass filters 130, 120, before being transmitted by the antenna 110. In Rx operation, a signal is received by the antenna no and passed through bandpass filter 120. Switches 160 are configured so that the signal can then pass through LNAs 140 and bandpass filter 130 before being passed through analogue to digital converter 190 and relayed to the digital unit 400 for onward communication within the wireless communication network.

In general, arrangements recognise that resonant tunnelling diode devices can be used to further simplify a common single amplification path such as that shown schematically in FIG. 2a.

Figure 2B:
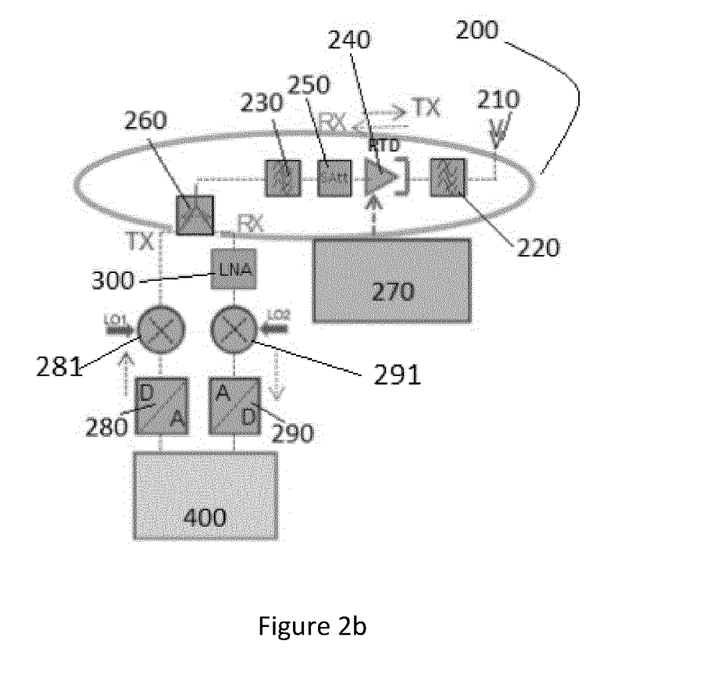
FIG. 2b illustrates schematically an example embodiment of the subject matter described herein.

FIG. 2b illustrates schematically an example embodiment of the subject matter described herein. The example arrangement of FIG. 2b provides a common amplification path for transmit and receive operation by using a resonant tunnelling diode (RTD) device 240. The example apparatus 200 comprises: an antenna 210, which is configured to both transmit (Tx) and receive (Rx) wireless communication signals. In the arrangement illustrated a digital unit 400 is coupled to the antenna 210 via a bidirectional amplification path and various other components Operation of apparatus such as the examples illustrated schematically in FIGS. 2 to 4 occurs generally according to the following principles.

Taking transmit (Tx) operation first, a signal to be transmitted, which may be a signal to be transmitted to user equipment operating within a wireless communication network, is fed to and identified by digital unit 400. That digital unit 400 may be a baseband unit. The digital unit is configured to prepare digital voice and data signals for transmission and/or reception. When operating in Tx, the digital unit receives a signal, for example, a voice or data signal and operates to convert the base band signals from digital to analogue by passing the signal through a digital to analogue converter 280. To ensure efficient operation of a transceiver and antenna apparatus, the generated analogue signal is mixed using a mixer 281 controlled by a local oscillator LO1, which allows the signal to be upscaled in frequency to RF frequencies, and from there passed to the amplification chain circuitry, including the RTD and from there to an antenna 210. In the examples shown in FIG. 2b, FIG. 3 and FIG. 4 a single switch 260 is configured to allow a common set of components to operate in both the transmit and receive chains. Alternatives to a switch are described and shown in relation to FIG. 2c and FIG. 2d.

The signal to be transmitted by the antenna 210 is passed through the common amplification chain including an RTD device 240. Operation of the RTD device is controlled by a single voltage set by a voltage control unit 270. The signal is passed through an appropriate bandpass filter 230 and attenuator 250 before reaching the RTD. In transmit mode the RTD has a bias voltage selected to be in the negative differential conductance region of the N shaped I-V relationship associated with, and characteristic of, RTD 240. As a result, the RTD is operating in a high gain region and the signal is amplified. The signal is then passed through another appropriate bandpass filter 220 before reaching an input of an antenna 210 and then being transmitted by the antenna 210.

In Rx operation, an analogue signal is received by the antenna 210 and passed through bandpass filter 220 to remove any signals which are unlikely to be of relevance. The switch 260 and RTD bias supply voltage 270 are configured so that the analogue signal can pass to the RTD 240. The RTD bias supply voltage in apparatus Rx mode is selected such that the RTD is operating near the peak of the N shaped I-V relationship associated with, and characteristic of, RTD 240. It will be appreciated that a received signal may be weak and therefore increased sensitivity enhances operation of the apparatus. From the RTD, the signal is passed through bandpass filter 230. Since a received signal is often weaker than may be desired for efficient apparatus operation, and since the RTD may not introduce sufficient gain, in this example, a Low Noise Amplifier 300 is included in the receive chain. After amplification, the received signal is again passed through a mixer 291, controlled by local oscillator LO2 signal to mix the signal down to the baseband of the intermediate frequency range, before the signal of interest is then being passed to an analogue to digital converter 290 and relayed to the digital unit 400 for onward communication within the wireless communication network.

Switching the transceiver between transmit and receive mode may include adjusting the RTD device 240 bias voltage 270. When operating in transmit mode, the bias voltage may be selected to be in an NDR region of an N-shaped current-voltage characteristic associated with RTD 240. When operating in receive mode, the bias voltage may be selected to be in the region of a peak of the N-shaped current-voltage characteristic associated with RTD 240. In some arrangements, such as that shown in FIG. 2b, a LNA 300 is included in the Rx path. The RTD supply voltage 270 may be adjusted, within the region of the peak of the N-shaped current-voltage characteristic associated with the RTD device, and a voltage applied to the LNA 300 may also be adjusted, to enhance operation of the transceiver, and to control, for example, power consumption and/or overall sensitivity of the transceiver operating in receiver mode.

It can be seen by comparing FIG. 2a and FIG. 2b that arrangements in which an RTD device 240 is used allows for the possibility of removing the need for an RF switch 160 at the output of a common amplification path as required in an arrangement such as that shown in FIG. 2a. Exclusion of such an RF switch 160 allows for a reduction in output network losses after the final amplification stage. Losses incurred at that stage significantly adversely affect overall losses incurred. Simplification of control circuitry also reduces required control effort since, in some modes of operation (TDD), only one switch has to be adequately controlled.

It will also be appreciated that use of an RTD within an amplification path may allow for a reduction of the common RF receive and transmit path to only the RTD 240, filtering 220, 230 and antenna 210. That may particularly be the case if required transmit power levels are in the range of RTD capabilities. Arrangements may allow, as illustrated in the circled circuit region shown in FIG. 2b, that any additional low noise amplifier(s) (LNAs) 30o are moved out of the common (bidirectional) radio frequency downlink and uplink path indicated by the circled region. In other words, the common RF path topology is particularly simple.

It will be appreciated that whilst a single RTD is illustrated in the various examples shown in FIG. 2b to FIG. 4, if a single RTD does not provide sufficient gain for a particular application, a second RTD device may be included in the common amplification circuitry. Such an arrangement may require each RTD to have an independently controlled supply voltage, but the general topology of the circuitry is largely unchanged, since a single switch, circulator or splitter 260 may still be used.

In the arrangement shown schematically in FIG. 2b, if the required transmit power is in the range of the capability of the RTD, a low noise amplifier 300 may only be assumed to be required in relation to the Rx signal path. Such a low noise amplifier 300 is located such that it is shifted to a position after the switch 260 and thereby does not impact upon a Tx path. A low noise amplifier 300 may be required for the Rx path since the RTD 240 may only show limited gain in some Rx operation scenarios. In relation to the Tx path, sufficient RTD gain may be assumed. It will be appreciated, depending on application and required gain in combination with analogue to digital converter input level, that it is possible that the low noise amplifier in the Rx path may also be omitted. An additional LNA in the Rx path may be beneficial since, when the RTD is operating in the Rx path in a high sensitivity mode, the RTD gain is low. Therefore, depending on Rx input, the signal level at the antenna may not be sufficient at the output of the RTD to allow for further effective transceiver operation. As described previously, in some arrangements an additional gain stage (LNA 300) is used to provide sufficient total gain to achieve an appropriate control level at an input of the analogue-to-digital converter 290.

The general method of operation of a shared amplification path using an RTD such as that shown in FIG. 2b is such that the RTD 240 is biased by a control voltage 270 in dependence upon the desired direction of operation of the amplification chain, namely transmit or receive. In relation to an arrangement such as that shown in FIG. 2b, the RF switch 260 is coordinated to reflect transmit or receive operation and either direct an up-converted signal to be transmitted to the common RTD-based RF path (in the case of transmit operation) or to direct the received RF signal from the RTD-based common RF path to a low noise amplifier 300 input (if the optional LNA 300 is fitted) and subsequently to the down converter 290 (in the case of receive operation). As a result, arrangements such as radio communication device 200 comprising radio circuitry and an antenna shown in FIG. 2b, can provide a compact common transmit and receive transceiver which is applicable to time division duplex (TDD) applications and which requires simple control of direction of amplification chain operation.

Use of RTD devices is applicable to low to medium power levels when compared, for example, to an arrangement as shown in FIG. 2a. The advanced high frequency application ranges of RTDs make the arrangement shown in FIG. 2b particularly suitable for transceivers operating in microwave, high-mm-wave and THz applications.

A simple variant of the RTD based concept shown in FIG. 2b could be that a low noise amplifier is located at the output of a down-conversion mixer (not shown in FIG. 2b) thereby allowing the use of low noise amplifiers with higher efficiency in a lower frequency range, after signal down-conversion.

Figure 2C:
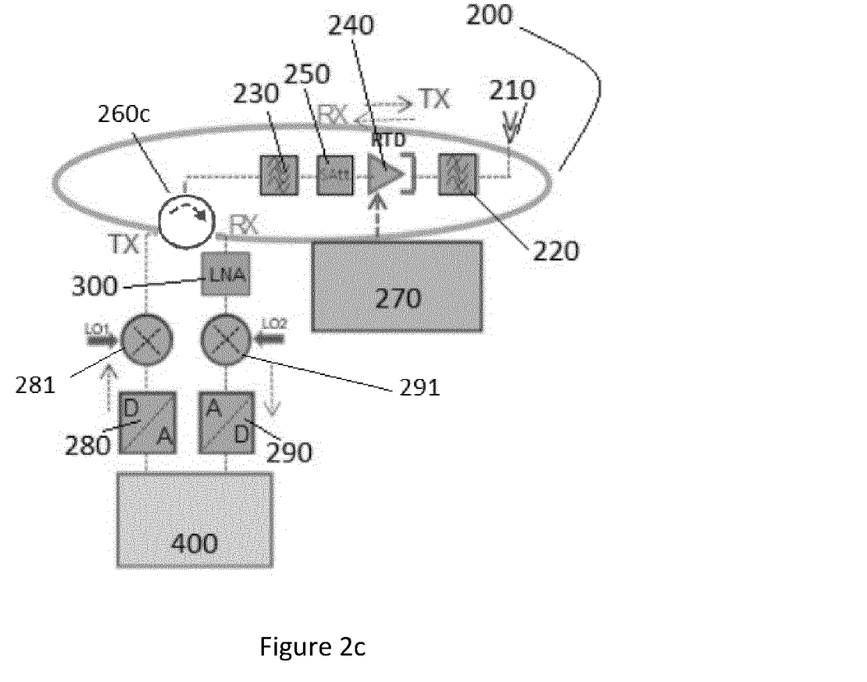
FIG. 2c illustrates schematically an alternative example embodiment of the subject matter described herein.
Figure 2D:
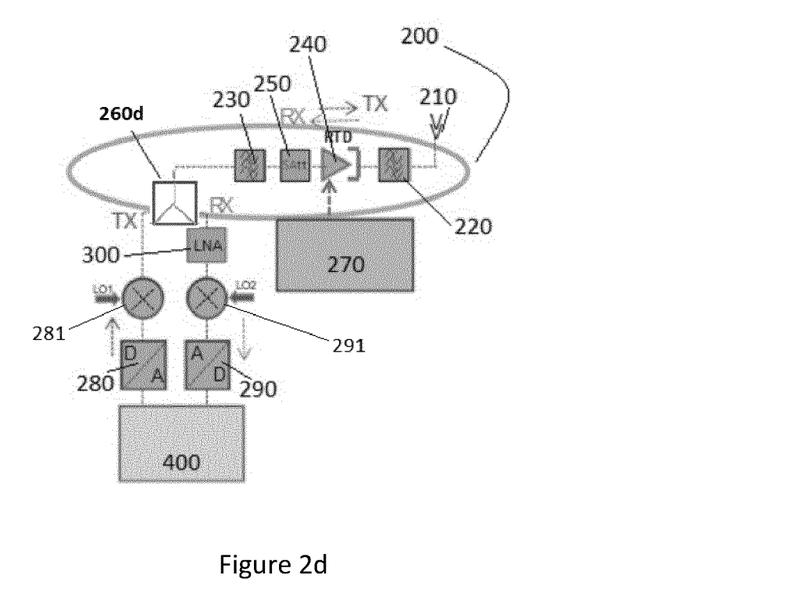
FIG. 2d illustrates schematically an alternative example embodiment of the subject matter described herein.

FIGS. 2c and 2d illustrate schematically alternative example embodiments of the arrangement shown in FIG. 2b. The arrangements differ in that the arrangement of FIG. 2C a circulator 260c is used instead of a switch 260; and in FIG. 2d a splitter 260d is used instead of a switch 260. The nature of the components selected for use in the amplification circuitry may depend on application. Both a splitter and a circulator are such that they support operation of the amplification circuitry within the apparatus without requiring specific control. That is to say, control of the RTD bias voltage, and in some arrangements, supply voltage of an LNA in the receive chain to optimise apparatus operation, is enough to switch the transceiver between transmit and receive operation.

It will be appreciated that, depending upon application and compromises which are acceptable in a given application, alternative components may also be considered in relation to other parts of the apparatus. For example, instead of the mixers 281; 291 which are used for up-conversion and down-conversion, it is possible to use IQ modulators. Mixers have a low power consumption but use of IQ modulators may result in less need to filter a signal.

Furthermore, instead of conventional D/A and A/D converters, it is possible to implement apparatus in which Radio Frequency Digital to Analogue Converters (RFDACs) are used. Use of RFDACs may allow direct conversion of a digital signal stream to an analogue RF signal (for example, up to 6 GHz) and vice versa on the receive side. On transmit side, it can be either directly fed to the RTD via the switch or circulator and an optional filter without additional mixing (up-conversion), if the analogue RF signal already corresponds to the wanted RF frequency to be transmitted. Alternatively, it can be fed into a mixer for further up-conversion to high mm-wave or THz frequency range before being provided to the RTD via the switch or circulator and a filter in cases where a desired transmit frequency is higher than the intermediate frequency provided by the RFDAC. In the latter case, the analogue output signal at the output of the RFDAC acts as an intermediate frequency. On the receive side a similar principle can be applied: either the received signal is directly fed to the analogue-to-digital converter on a RF frequency range (if the signal frequency is in the input bandwidth of the ADC) or an additional mixer is used to convert the high mm-wave or THz signal down to an intermediate frequency level which is within the input bandwidth of the analogue-to-digital converter.

Figure 3:
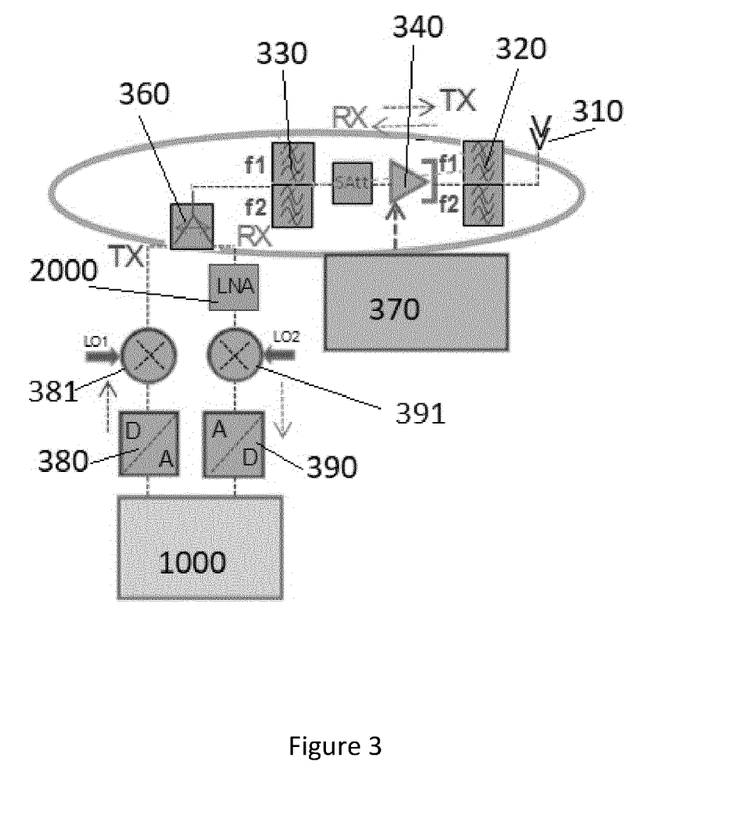
FIG. 3 illustrates schematically an alternative example embodiment of the subject matter described herein.

FIG. 3 illustrates an arrangement comprising an RTD-based multiband capable transceiver. By substituting the single band filters 220, 230 in the common radio frequency path shown in FIG. 2b by multiband-capable filters 320, 330 and by providing use of a multiband-capable RTD 340, RF switch 360, and mixers 381, 391, it will be appreciated that it is possible to extend the concept explained in relation to FIG. 2b to a multiband capable transceiver. The general operation of the multiband capable transceiver is similar to that which has been described in relation to a single band TDD concept and analogous reference numerals have been used where appropriate. The example arrangement of FIG. 3 provides a common amplification path for transmit and receive operation by using a resonant tunnelling diode (RTD) device 340. The example antenna apparatus comprises: an antenna 310, which is configured to both transmit (Tx) and receive (Rx) wireless communication signals and is also multiband/wideband capable. In the arrangement illustrated, a digital unit 1000 is coupled to the antenna 310 via a bidirectional amplification path and various other components, the general operation of which was set out in relation to FIG. 2b.

Taking Tx operation first, a signal to be transmitted is identified by digital unit 1000 and passed through a digital to analogue converter 380. A single switch 360 is configured to allow a common set of components to operate in both the transmit and receive chains. The signal to be transmitted by the antenna 310 is passed through a common amplification chain including an RTD device 340, the operation of which is controlled by a single voltage set by a voltage control unit 370, and appropriate multi-bandpass filters 330, 320, before being transmitted by the antenna 310. In Rx operation, a signal is received by the antenna 310 and passed through multi-band capable filter 320. The switch 360 and voltage control unit 370 are configured so that the signal can then pass through the RTD 340 and bandpass filter 330 before being passed through, in this example, a Low Noise Amplifier 2000, then an analogue to digital converter 390 and relayed to the digital unit 1000 for onward communication within the wireless communication network.

Figure 4:
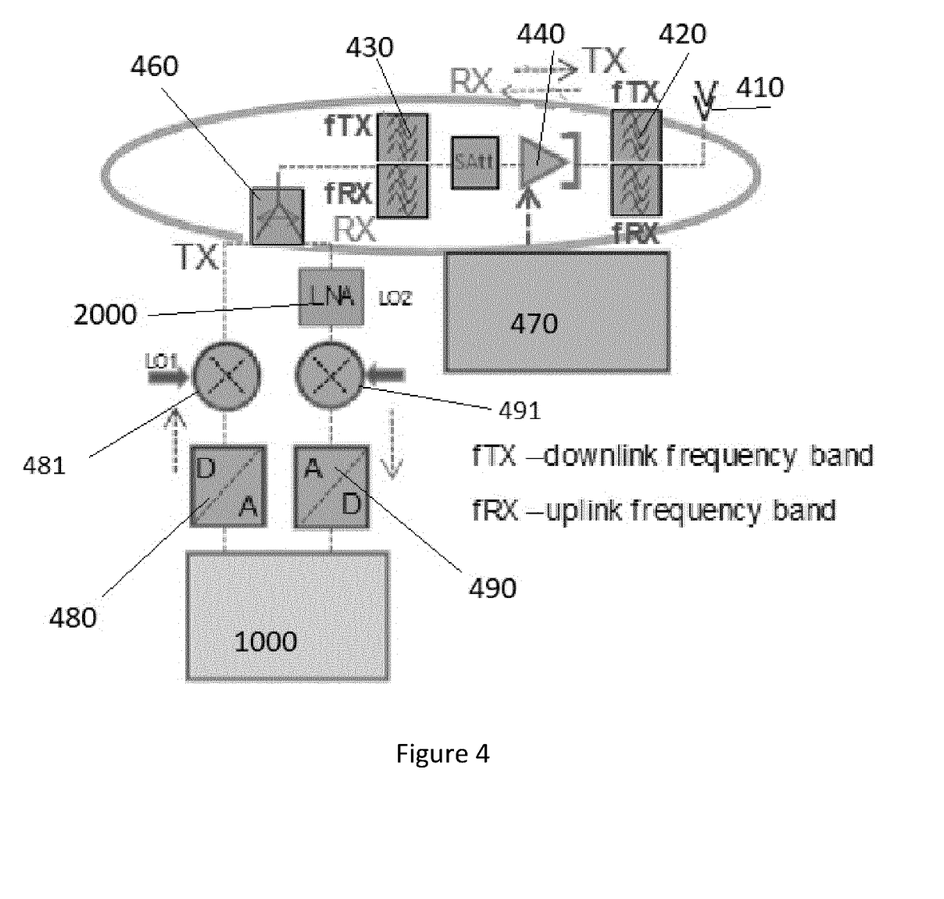
FIG. 4 illustrates schematically an alternative example embodiment of the subject matter described herein.

FIG. 4 illustrates schematically an example arrangement of an RTD-based time multiplex frequency division duplex (FDD) transceiver in accordance with one arrangement. In the example shown in FIG. 4, use of diplex filters, 420, 430 allows for time multiplexed FDD operation. The diplex filters 420, 430 support, in this case, the downlink as well as the uplink frequency band of the FDD standard of interest. By use of a time multiplexed arrangement, a common RTD-based downlink and uplink path can be used in relation to FDD. Such a concept may, of course, be used in relation to IoT applications. The example arrangement of FIG. 4 provides a common amplification path for downlink and uplink operation by using a resonant tunnelling diode (RTD) device 440. The example apparatus comprises: an antenna 410, which is configured to both transmit (Tx) and receive (Rx) wireless communication signals. In the arrangement illustrated a digital unit 1000 is coupled to the antenna 410 via a bidirectional amplification path and various other components. Taking Tx operation first, a signal to be transmitted is identified by digital unit 1000 and passed through a digital to analogue converter 480. A single switch 460 is configured to allow a common set of components to operate in both the transmit and receive chains. The signal to be transmitted by the antenna 410 is passed through a common amplification chain including an RTD device 440, the operation of which is controlled by a single voltage set by a voltage control unit 470, and appropriate multiband capable bandpass filters 430, 420, before being transmitted by the antenna 410. In Rx operation, a signal is received by the antenna 410 and passed through the multiband capable bandpass filter 420. The switch 460 and voltage 470 are configured so that the signal can then pass through the RTD 440 and multiband capable bandpass filter 430 before being passed through, in this example, a Low Noise Amplifier 2000, then an analogue to digital converter 490 and relayed to the digital unit 1000 for onward communication within the wireless communication network.

Figure 5:
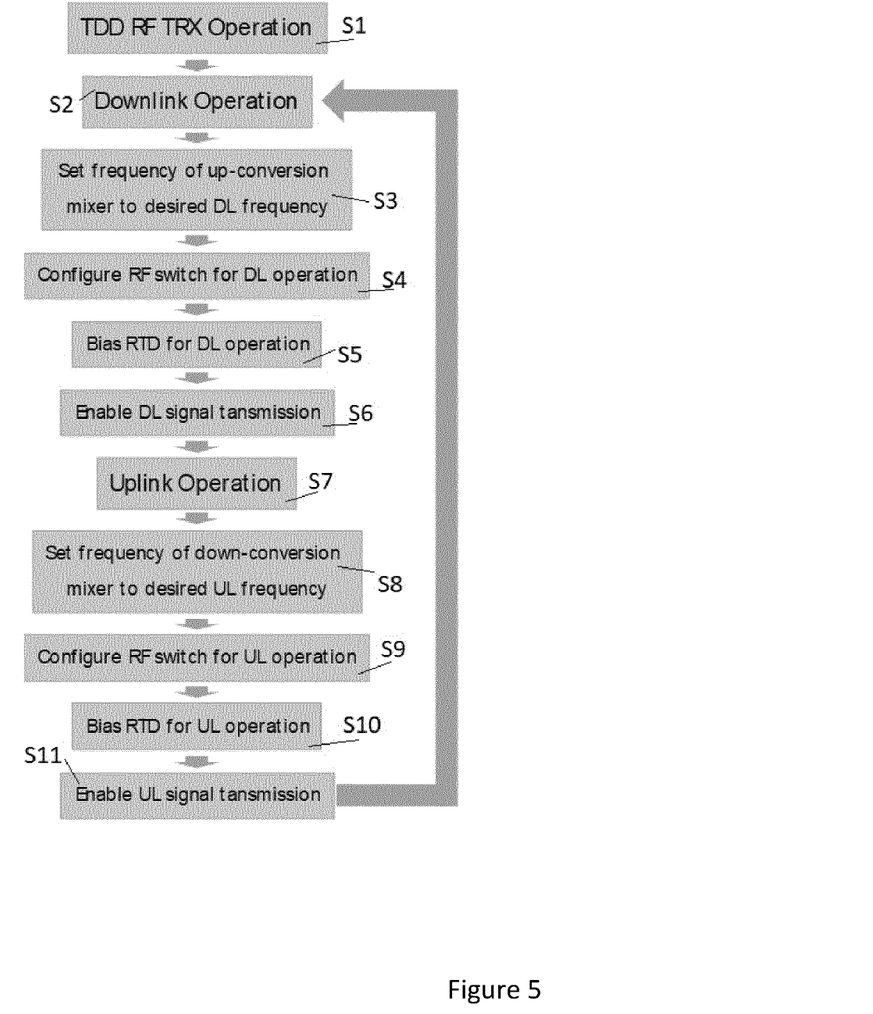
FIG. 5 is a flowchart illustrating schematically a method of operation of an example embodiment such as that shown in FIG. 2b.

FIG. 5 is a flowchart illustrating schematically a method of operation of an RTD-based common amplification chain RF transceiver in the case of TDD operation. The example method may be implemented to commission apparatus such as that illustrated in, for example, FIG. 2b. The illustrated method operates to configure the apparatus in relation to TDD transmit operation first (S1, S2). An up-conversion mixer is configured to support a desired frequency band by applying a related local oscillator (LO) frequency (S3). Once this step has been performed and a transmit frequency band is no longer to be changed, this step can be omitted. If the RF frequency of operation is to be changed, for example, a carrier frequency is to change, the LO frequency may be changed. After having configured the mixer for transmit operation, an RF switch is configured (S4) to direct a received signal, provided by the up-conversion mixer to a common RTD-based RF path. Subsequently, the step of optimising the bias voltage applied to the RTD for transmit operation occurs (S5). Once those steps are performed, the RF front end of antenna apparatus 200 is configured for transmit operation, feeding the signal provided by the digital unit to be transmitted to the antenna via the common RTD-based RF path (S6).

Once a TDD transmit slot is finished but before a receive slot starts (S7), the down conversion mixer is configured to convert a received RF signal down to the wanted BB or IF level by applying a related LO signal (S8). Assuming the received frequency range remains unchanged, the LO may be fixed and this step can be skipped for subsequent iterations. Once the down conversion mixer is configured, the RF switch can be reconfigured to support receive operation (S9) and a received RF signal is fed from the antenna via a common RTD-based RF path to the input of a low noise amplifier to be amplified and subsequently down-converted by the digital unit. Before receive operation is enabled (S11), the RTD is biased and configured for receive operation (S10) and is then operable to feed the signal received from the antenna to the RF switch.

As indicated by the large arrow in FIG. 5, the steps described can be iterated for continuous TDD operation. In cases where no transceiver operation is required, for example, some of the antenna elements or transceivers of, for example, a massive MIMO system may be shut down in instances of a low load, then an RTD-based transceiver may also be shut down to save energy. The transceiver may be reactivated based on the described procedure when operation is again initiated.

The concepts described above can be implemented in relation to stationary electronics equipment forming network infrastructure of a wireless communication network. That fixed or stationary electronics equipment may, for example, include a base station, router, or other similar network node.

The concepts described above may also be implemented on mobile electronics equipment from which a wireless communication network is accessed by users. Such electronics equipment may include, for example, user equipment, mobile phones, laptops and similar.

Arrangements described have a large range of applicability as a result the large number of frequency ranges and bands to which the principle can be applied. For example, the approach may be applied in relation to frequency bands up to 6 GHz; further applications are cogitable or different applications (backhauling, access) operating around 30 GHz, 39 GHz, 60 GHz and the RTD allows the approach to be used through various frequency bands, including 100 Ghz, through to THz frequency bands.

For high mm-wave or THz frequencies, in particular, the so called J-band, which covers the frequency spectrum from approx. 250 GHz to 320 GHz, the main purpose of arrangements such as those described may be in the support of user access to a wireless communication network. In particular, arrangements such as those described may be useful to support: a variable channel bandwidth across J-band defined with 8 different channel bandwidths (as multiples of 2.16 GHz); 2 PHY-modes (THz-SC PHY, THz-OOK-PHY) with 7 modulation schemes: BPSK, QPSK, 8-PSK, 8-APSK, 16-QAM, 64 QAM, OOK; and/or 3 channel coding schemes: 14/15-rate LDPC (1440,1344), 11/14-rate LDPC, (1440,1056), 11/14-rate RS(240,224)-code.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A transceiver, comprising:
   a transmit signal path;
   a receive signal path;
   bidirectional amplification circuitry reconfigurable for use in both the transmit signal path or receive signal path; said amplification circuitry including at least one resonant tunnelling diode, wherein the amplification circuitry further comprises an adjustable attenuator, and the control circuitry is configured to set attenuation of the attenuator in dependence upon one or more of: network load and converter control; and
   control circuitry configured to selectively couple the amplification circuitry into the transmit or receive path of the transceiver in dependence upon whether said transceiver is to operate to transmit or receive a signal, wherein
   the control circuitry is configured to adjust a supply voltage associated with the at least one resonant tunnelling diode of the amplification circuitry depending on an operating mode of the transceiver, and
   when the transceiver is to operate to transmit a signal, the control circuitry is configured to adjust the supply voltage associated with the at least one resonant tunnelling diode to a value such that the resonant tunnelling diode operates in a negative differential conductance region of an N-shaped current-voltage characteristic associated with the at least one resonant tunnelling diode.

2. The transceiver of claim 1, wherein when the transceiver is to operate to receive a signal, the control circuitry is configured to adjust the supply voltage associated with the at least one resonant tunnelling diode to a value such that the resonant tunnelling diode operates in a region of the peak of an N-shaped current voltage characteristic associated with the at least one resonant tunnelling diode.

3. The transceiver of claim 1, wherein the control circuitry comprises: a switch and resonant tunnelling diode supply voltage controller and wherein the amplification circuitry is coupled between the switch and an antenna connector.

4. The transceiver of claim 1, wherein the control circuitry comprises: a circulator and resonant tunnelling diode supply voltage controller and wherein the amplification circuitry is coupled between the circulator and an antenna connector.

5. The transceiver of claim 1, wherein the control circuitry is configured to couple the amplification circuitry into a signal path as a first amplifier in the receive signal path to amplify a radio-frequency received signal.

6. The transceiver of claim 5, wherein the transceiver further comprises an additional amplifier and the control circuitry is configured to couple the additional amplifier into the receive path as a second amplifier in the receive signal path.

7. The transceiver of claim 1, wherein the control circuitry is configured to couple the amplification circuitry into a signal path as a last amplifier in the transmit signal path to amplify a radio-frequency signal to be transmitted.

8. The transceiver of claim 1, wherein the amplification circuitry further comprises one or more of: a band pass filter; a dual band filter.

9. The transceiver of claim 8, wherein the control circuitry is further configured to set attenuation of the attenuator in dependence upon operating mode of the transceiver.

10. The transceiver of claim 1, configured to operate to receive and transmit a Terahertz frequency signal.

11. An electronic radio communications device comprising the transceiver of claim 1.

12. A transceiver system comprising a plurality of antennas and a plurality of transceivers according to claim 1, wherein each transceiver of the plurality of transceivers is coupled to at least one antenna of the plurality of antennas.

13. A method for operating a transceiver, the method comprising:
  coupling bidirectional amplification circuitry including at least one resonant tunnelling diode into a receive signal path of the transceiver to amplify a receive signal during a receive operating mode of the transceiver, wherein the amplification circuitry further comprises an adjustable attenuator, and the control circuitry is configured to set attenuation of the attenuator in dependence upon one or more of: network load and converter control; and
  coupling the bidirectional amplification circuitry including at least one resonant tunnelling diode into a transmit signal path of the transceiver to amplify a transmit signal during a transmit operating mode of the transceiver, wherein
  the control circuitry is configured to adjust a supply voltage associated with the at least one resonant tunnelling diode of the amplification circuitry depending on an operating mode of the transceiver, and
  when the transceiver is to operate to transmit a signal, the control circuitry is configured to adjust the supply voltage associated with the at least one resonant tunnelling diode to a value such that the resonant tunnelling diode operates in a negative differential conductance region of an N-shaped current-voltage characteristic associated with the at least one resonant tunnelling diode.

14. A transceiver, comprising:
a transmit signal path;
a receive signal path;
bidirectional amplification circuitry reconfigurable for use in both the transmit signal path or receive signal path; said amplification circuitry including at least one resonant tunnelling diode, wherein the amplification circuitry further comprises an adjustable attenuator, and the control circuitry is configured to set attenuation of the attenuator in dependence upon one or more of: network load and converter control; and
control circuitry configured to selectively couple the amplification circuitry into the transmit or receive path of the transceiver in dependence upon whether said transceiver is to operate to transmit or receive a signal, wherein
the control circuitry is configured to adjust a supply voltage associated with the at least one resonant tunnelling diode of the amplification circuitry depending on an operating mode of the transceiver, and
when the transceiver is to operate to receive a signal, the control circuitry is configured to adjust the supply voltage associated with the at least one resonant tunnelling diode to a value such that the resonant tunnelling diode operates in a region of the peak of an N-shaped current-voltage characteristic associated with the at least one resonant tunnelling diode.

* * * * *